J. A. COGSWELL.
WOOD PAVING BLOCK.
APPLICATION FILED JUNE 17, 1911.

1,017,650.

Patented Feb. 20, 1912.

Witnesses;
J. L. O'Neill
H. B. Davis.

Inventor;
James A. Cogswell
By Noyes & Harriman
Attys.

UNITED STATES PATENT OFFICE.

JAMES A. COGSWELL, OF BOSTON, MASSACHUSETTS.

WOOD PAVING-BLOCK.

1,017,650. Specification of Letters Patent. Patented Feb. 20, 1912.

Application filed June 17, 1911. Serial No. 633,808.

*To all whom it may concern:*

Be it known that I, JAMES A. COGSWELL, residing at Boston, in the county of Suffolk and State of Massachusetts, have invented an Improvement in Wood Paving-Blocks, of which the following is a specification.

This invention relates to paving-blocks, and has for its object to provide a block with an improved form of grid projecting from its tread-face a short distance to be engaged by the calks of horse-shoes, and thereby prevent horses from slipping.

In the present embodiment of my invention the block, usually of wood, has formed in its tread-face, a kerf extended from end to end thereof having parallel sides, which is adapted to receive a grid. The grid is made as a flat bar or strip of iron or other suitable material, having parallel sides, which is made of a thickness to snugly fit the kerf, and of a width greater than the depth of the kerf, so that when fitted therein its upper edge portion will project therefrom a short distance, and of a length somewhat less than the length of the block, so that when arranged in the kerf spaces will be formed at one or both ends of the grid which admit of the entrance of a hook-like tool, for the purpose of lifting the grid by a prying action in order to remove it, thus providing for the substitution of new grids when required. One end of the grid is under-cut or chamfered off at its under side to enable the hook-like tool to engage the grid. When the blocks are laid the spaces in the kerf at the ends of the grid are filled with cement, which acts to bind the grids in place, the cement serving as a locking-key to connect two adjacent blocks, and thus assist in holding them against displacement.

Figure 1:
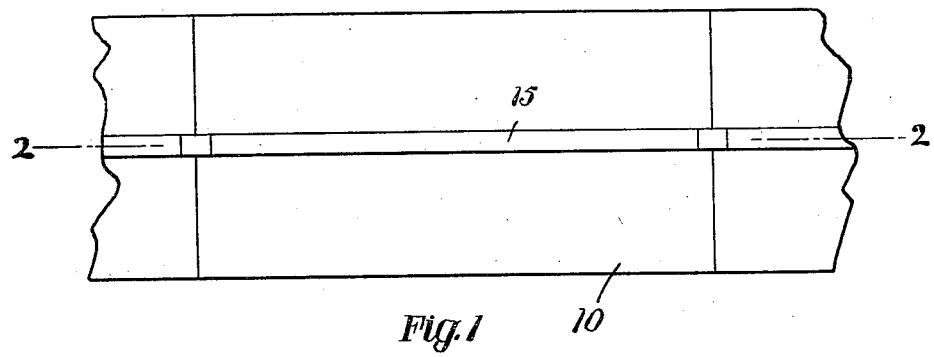
Figure 2:
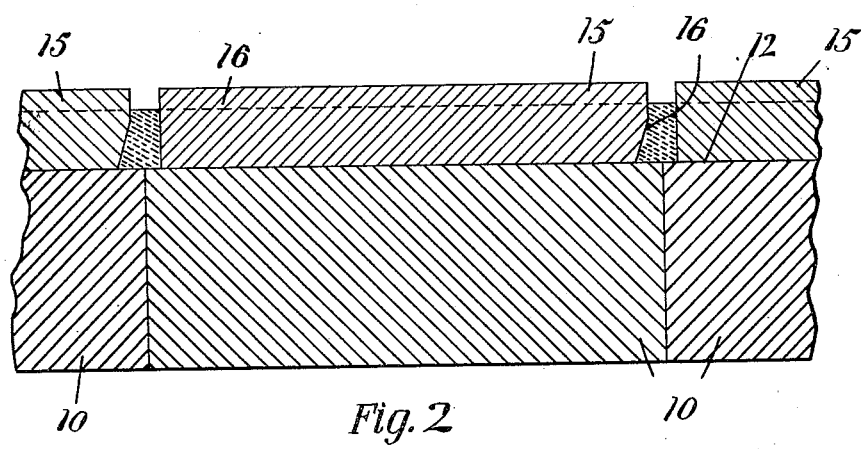
Figure 3:
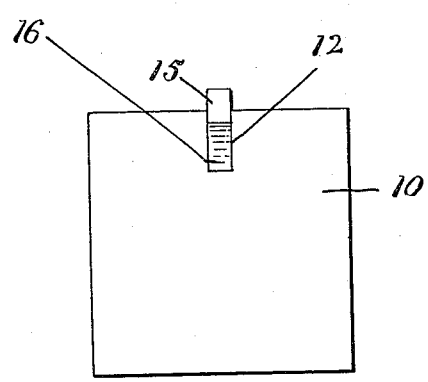

Figure 1 is a plan view of a section of pavement composed of paving-blocks embodying this invention. Fig. 2 is a vertical longitudinal section taken on the dotted line 2—2, Fig. 1. Fig. 3 is an end view of the block.

The block 10 is composed of wood or other suitable material, and of suitable dimensions to serve as a paving-block. It has formed in its tread-face a kerf 12 which extends from end to end of the block. Said kerf may be formed by any suitable means, and preferably has parallel sides adapting it to receive a grid having parallel sides. The grid 15 is composed of iron or other suitable material, and is made of a thickness to snugly fit the kerf and of a width greater than the depth of the kerf, so as to project therefrom, when bottoming therein, and of a length somewhat less than the length of the block, so that when driven or fitted into the kerf there will be a space left in the kerf at one or both ends of the block, according to the disposition of the grid with respect to the block. The grid is under-cut or chamfered off at one end as at 16. When the grid is driven into the kerf, so as to bottom therein, its upper edge portion will project a short distance above the tread-face for engagement therewith of the calks of horse-shoes.

The pavement which may be composed entirely or for the most part of my improved blocks is arranged in rows, their ends abutting together, and when so laid the spaces in the kerf at the ends of the grids are filled with cement which soon becomes hard and forms a locking-key for the adjacent blocks, and also consists in holding the grid in place.

When it is desired to remove a grid the cement filling is removed and a hook-like tool, of any suitable description, may be used, which is projected down into the space at the under-cut end of the grid, and brought into firm engagement therewith, and then by a prying action of the tool the grid is lifted.

I claim:—

1. As a new article of manufacture, the paving-block herein described consisting of a block having a kerf in its tread-face, extended longitudinally with respect to the block from end to end thereof, a metal grid made of a thickness corresponding to the width of the block and of a depth greater than the depth of the kerf, and of a length less than the length of the kerf, said grid being fitted into the kerf so as to leave a space at one or both ends thereof, adapted to be filled with cement when arranged adjacent another block.

2. As a new article of manufacture, the paving-block herein described consisting of a block having a kerf in its tread-face extended longitudinally with respect to the block from end to end thereof, a metal grid of a thickness corresponding to the width of the block, and of a depth greater than the depth of the kerf, and of a length less than the length of the kerf and having one end under-cut, said grid being fitted into the kerf so as to leave a space at one or both ends thereof adapted to be filled with cement when arranged adjacent another block.

3. A section of street pavement composed of blocks arranged in a row, each block having a kerf in its tread-face and a grid arranged therein and projecting therefrom which is made of less length than the length of the block, thereby leaving spaces in the kerf at the ends of the block, and cement-keys arranged in said spaces which connect the blocks together, substantially as described.

In testimony whereof, I have signed my name to this specification, in the presence of two subscribing witnesses.

JAMES A. COGSWELL.

Witnesses:
B. J. NOYES,
H. B. DAVIS.

Copies of this patent may be obtained for five cents each, by addressing the "Commissioner of Patents, Washington, D. C."